US006279993B1

(12) United States Patent
Berthiaume

(10) Patent No.: US 6,279,993 B1
(45) Date of Patent: Aug. 28, 2001

(54) ADAPTATION OF GOLF CART SEATS

(76) Inventor: Cheryl A. Berthiaume, 68-4 S. Quinsigamond Ave., Shrewsbury, MA (US) 01545

( * ) Notice: Subject to any disclaimer, the term of this patent is extended or adjusted under 35 U.S.C. 154(b) by 0 days.

(21) Appl. No.: 08/020,709

(22) Filed: Feb. 22, 1993

(51) Int. Cl.[7] ................................................. A47C 31/00
(52) U.S. Cl. .................. 297/219.1; 297/224; 297/228.11
(58) Field of Search ................................. 297/219.1, 224, 297/228.11, 226

(56) References Cited

U.S. PATENT DOCUMENTS

| 2,191,956 | * | 2/1940 | Coldren | 297/224 |
| 2,483,223 | * | 9/1949 | Moss | 297/228.11 |
| 4,536,028 | * | 8/1985 | Jones et al. | 297/224 |
| 4,705,084 | * | 11/1987 | Rodebaugh et al. | 297/228.11 X |
| 4,718,721 | * | 1/1988 | Pompa | 297/224 X |
| 5,014,360 | * | 5/1991 | Smith et al. | 2/115 |

FOREIGN PATENT DOCUMENTS

1275736 * 5/1972 (GB) ..................................... 297/224

OTHER PUBLICATIONS

Textile Fabrics and their Selection, 7th Edition, Isabel B. Wingate, Prentice–Hall, Inc., 1976, pp. 475–476.*

* cited by examiner

Primary Examiner—Laurie K. Cranmer
(74) Attorney, Agent, or Firm—George E. Kersey

(57) ABSTRACT

Adaptation of a seating surface to a wide range of environmental conditions by applying a stretchable cover of a looped pile fabric, formed from blended materials, to the seating surface and promoting the retention on the seating surface of the stretchable cover which also is absorptive of fluids and insulative because of the blend of materials forming the cover.

12 Claims, 3 Drawing Sheets

ADAPTATION OF GOLF CART SEATS

BACKGROUND OF THE INVENTION

This invention relates to supporting surfaces, and more particularly, to the adaptation of support surfaces for golf carts to a wide variety of environmental conditions.

The conventional golf cart includes a user seat, which typically is made from a plastic, such as vinyl. Vinyl seats pose problems of comfort and practicality to the person seated on them.

On a hot day the plastic absorbs solar energy and becomes uncomfortably hot. This poses a problem, particularly when there is contact with a golfer's unprotected skin. In some cases, the heating effect can be sufficiently severe to produce a burn. Even when contact is with protected skin, there often is stickiness associated with plastic seats. Conversely, on a cold day, a vinyl seat can send a cold chill when the person is seated.

In addition, on a rainy day, moisture can collect on the seat and remain because of the relative impermeability of plastic. The result is further discomfort for the golfer.

In an attempt to deal with the discomfort associated with conventional golf cart seats, it is common practice for golfers to use a towel. The ordinary golfing towel is used primarily to wipe clubs and balls. It often has fasteners that make it inappropriate for sitting.

Furthermore, the need to adapt the golf cart seat to a wide variety of environmental conditions ranging from hot to cold is not conveniently met by any of the accessories currently available to golfers.

Accordingly, it is an object of the invention to adapt support surfaces to a wide range of environmental conditions. A related object is to adapt such surfaces to a wide range of temperature and atmospheric conditions, ranging from excessive heat to relative cold, and from dry to wet conditions.

A further object of the invention is to adapt the seats of golf carts for use in all kinds of weather, ranging from hot to cold, and from rain to shine. A related object is to make such adaptation with golf cart seats of plastic, such as vinyl.

Still another object of the invention is to eliminate the need for towels to protect golfers from seating discomfort associated with adverse temperature and climatic conditions.

SUMMARY OF THE INVENTION

In accomplishing the foregoing and related objects, the invention provides apparatus for adapting a seating surface to a wide range of environmental conditions by a stretchable cover and means joined to the cover for promoting the retention of the stretchable cover on the seating surface.

In accordance with aspects of the invention, the stretchable cover is absorptive of fluids or insulative. In order to achieve the desired stretchability, the cover can be of a looped pile fabric, such as Terry cloth.

In accordance with another aspect of the invention, the means joined to the cover can be a side member which promotes the retention of the stretchable cover panel on the seating surface.

The means joined to the cover can be a plurality of side members which promote the retention of the stretchable cover panel on the seating surface. The means joined to the cover can be a side member which is unitary with the cover and promote the retention of the stretchable cover panel on said seating surface.

In accordance with a further aspect of the invention, the means joined to the cover includes an elastomer which promotes the retention of the stretchable cover panel on the seating surface. The elastomer which promotes the retention of the stretchable cover on the seating surface can be integrated into the material of the cover. A plastic seating surface can be included under the cover.

In accordance with another aspect of the invention means can be provided for attaching the cover to a non-seating portion associated with the surface. In particular, a golf cart seat can be attached to the cover.

In a method of adapting a seating surface to a wide range of environmental conditions, the steps include placing a stretchable cover on the surface; and promoting the retention of the stretchable cover on the seating surface. The method can further include the step of insulating the surface by the cover, or the step of absorbing fluid by the cover. In a further step, there can be an increase in the retraction after stretching of the cover. In a still further step there can be attachment of the cover to a non-seating portion associated with the seating surface.

In a method of producing a seating surface that is adaptable to a wide variety of environmental conditions, the steps include converting a looped pile fabric into a cover for the seating surface; and supplementing the looped pile fabric cover by an elastomer to promote the adherence of the cover to the seating surface. In a further step the elastomer can be integrated into the looped pile fabric.

DESCRIPTION OF THE DRAWINGS

Other aspects of the invention will become apparent after considering several embodiments, taken in conjunction with the drawings in which.

DETAILED DESCRIPTION

Figure 1:
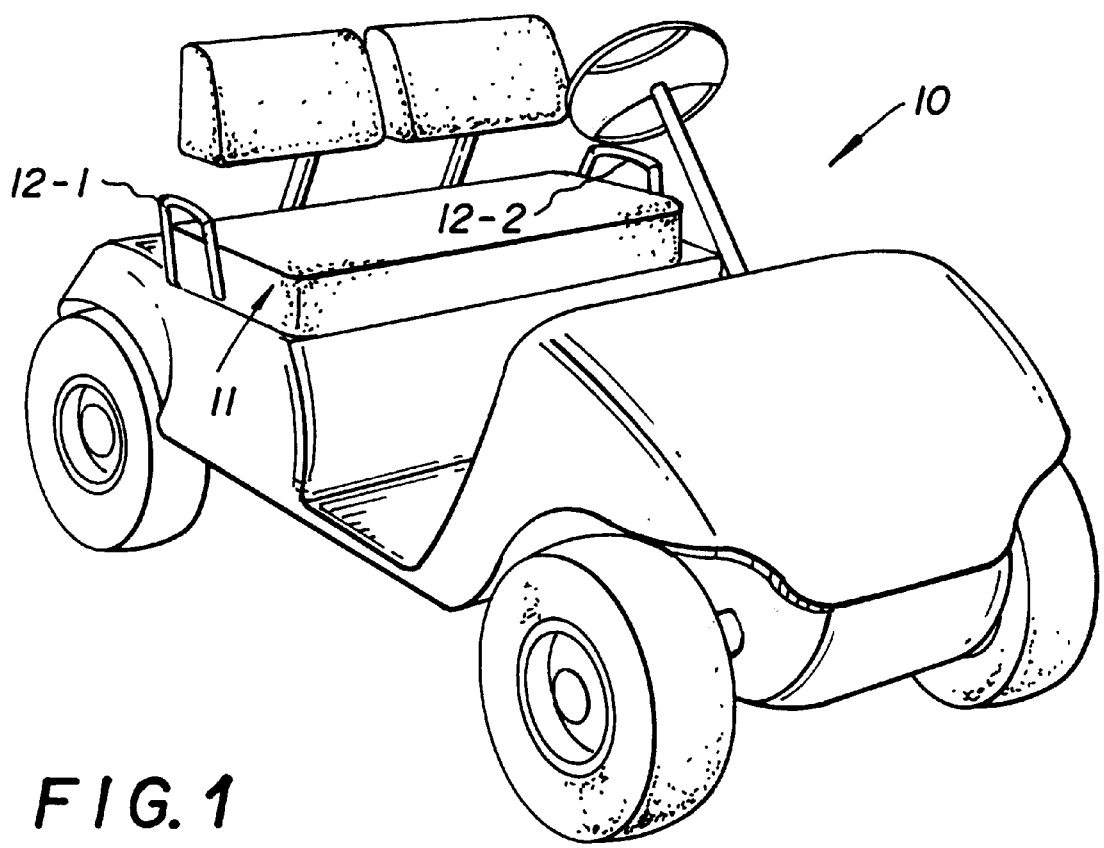
FIG. 1 is a perspective view showing golf carts of a kind commonly found at golf courses.

With reference to the drawings, FIG. 1 shows illustrative golf carts, of which the first golf cart 10 is pictured in isometric side view. The cart 10 is of conventional construction with a seat 11 having a plastic surface positioned between railings 12-1 and 12-2 that can be used by riding golfers to stabilize their positions on the seat 11 during movement of the cart 10 from one course location to another.

Since the seat 11 has a plastic surface, typically of vinyl, it can absorb heat on a hot day and be uncomfortable for sitting. In some cases the heating effect can be so great that there can be a burning sensation to exposed skin that comes into contact with the seat. Conversely, on a chilly day the seat can be uncomfortably cold, again because of the response of plastic to lowered temperatures. On a wet day the seat can be moist and have surface puddles of water. Even if there has been no rain, moisture from the air can condense on the seat, so that early morning golfers an make contact with undesirable moisture.

Figure 2:
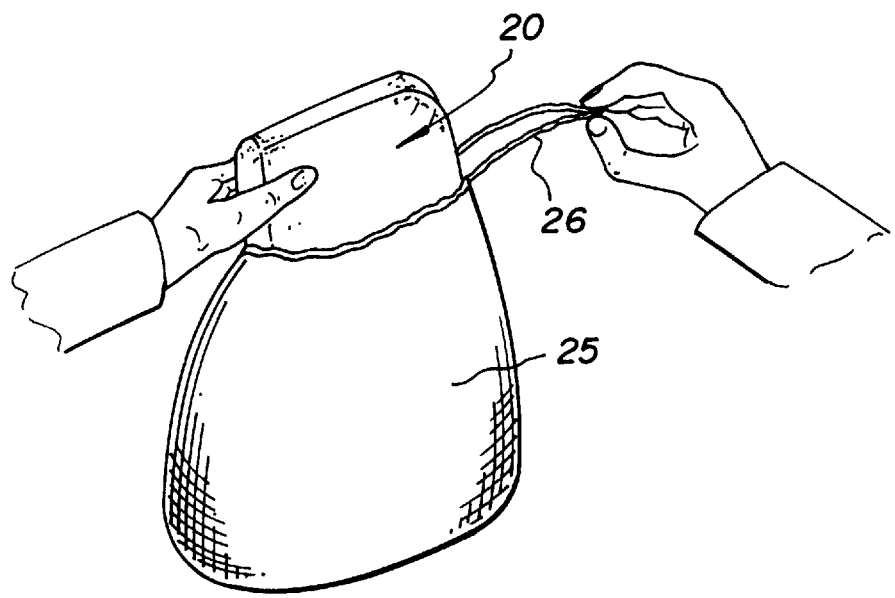
FIG. 2 is a perspective view showing a golf cart seat cover in accordance with the invention, being removed from a storage bag.
Figure 3:
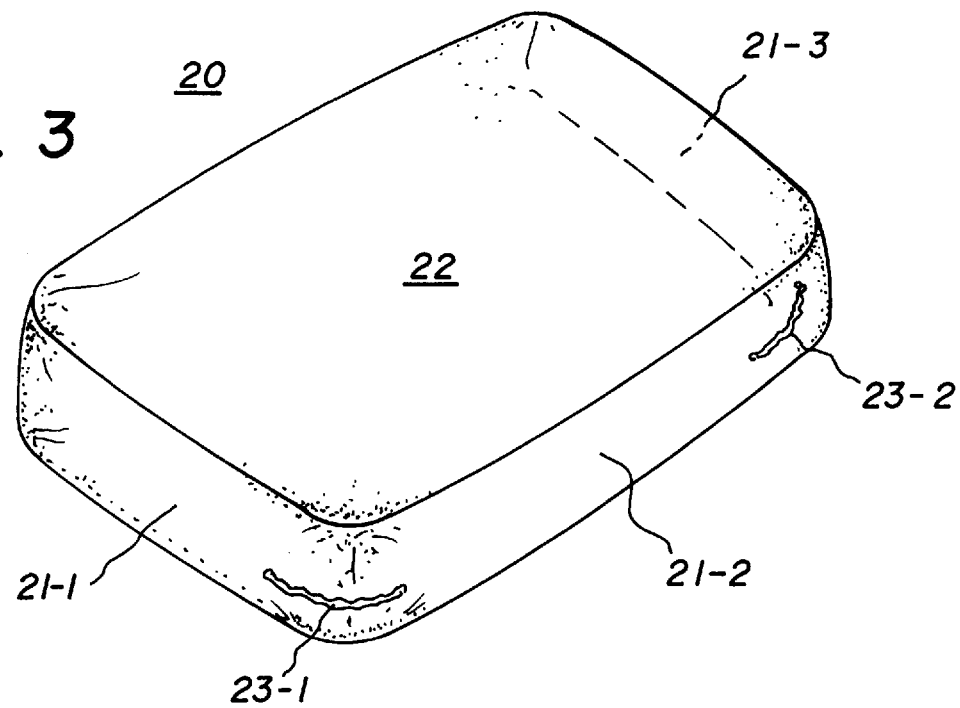
FIG. 3 is a perspective view of a golf cart seat cover in accordance with the invention.

In order to overcome the foregoing disadvantages associated with the conventional golf cart seats, the invention provides a cover 20 which is shown in FIG. 2 being removed from a fitted carrying pouch 25, which is opened and closed by a draw string 26. In particular, the cover 20 and the pouch 25 are of stretchable material. The stretchable character of the cover 20 permits it to be applied to the seat 11 of FIG. 1 and adhere to the seat by having side panels 21-1 through 21-3 as shown in the extended form of the cover 20 in FIG. 3. The side panels 21-1 through 21-3 are conveniently integral with the upper panel 22, and adherence of the cover 20 to the seat 11 can be promoted by the inclusion with the side panels 21-1 and 21-3 of integrated elastomers 23-1 and 23-2, which are joined to the front panel 21-2 near the lower edges of the respective side panels 21-1 and 21-3.

In order to provide the desired stretchability of the material forming the cover 20 and the pouch 25, a looped pile fabric is desirable. In addition to being stretchable, such a fabric is absorptive of moisture and is insulative. The stretchability of the fabric permits ready adaptation of the cover to the seat, while the fluid absorptive property eliminates the problems typically encountered with residual moisture on the seat. In addition, the insulative character of the fabric prevents contact with an excessively cold or hot plastic surface of the ordinary seat.

A suitable material for the cover 20 is of stretch "terry" cloth from filaments which are 25 percent polyester and 75 percent cotton. A suitable overall dimension is approximately 46 by 24 inches, and the cover has mitered elastic corners for accuracy. A mitered corner is a joint formed by the junction of two ends beveled at equal angles, typically 45 degrees.

Figure 4:
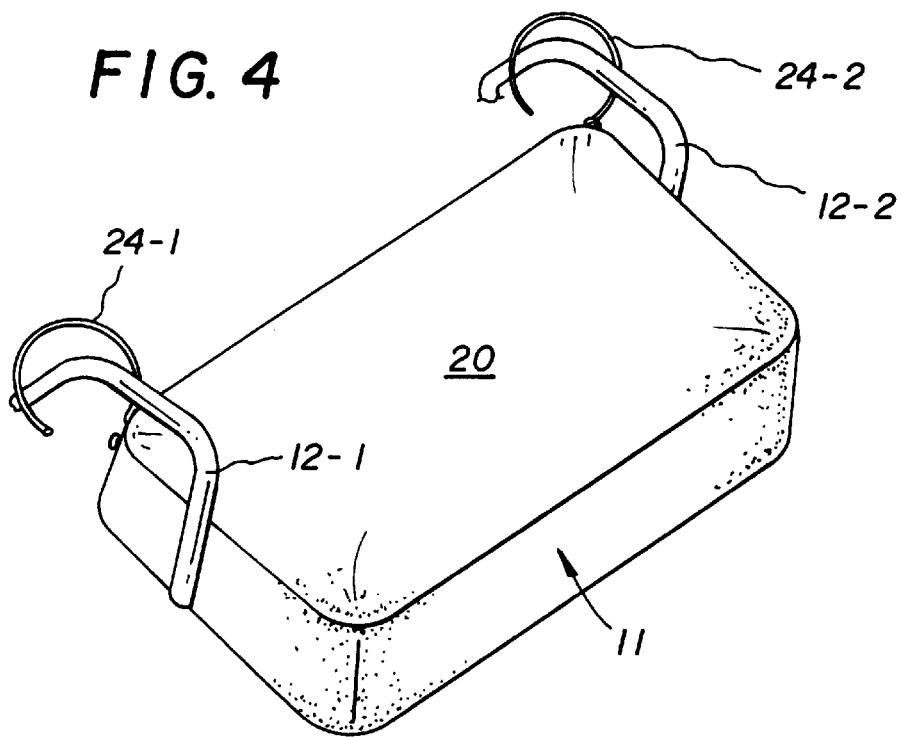
FIG. 4 is a perspective view showing the golf cart seat cover of FIG. 3 applied to a golf cart.
Figure 5:
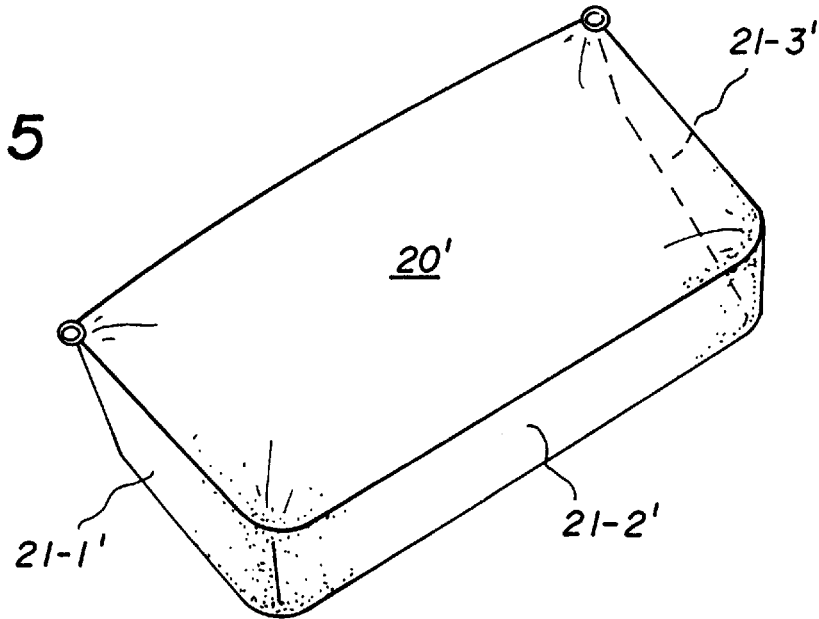
FIG. 5 is a perspective view showing an alternative golf cart seat cover of the invention secured by an accessory to cart structure associated with the seat.

In order to further assure the positioning of the cover on the seat 20, fasteners 24-1 and 24-2 can be included and secured to the side rails 12-1 and 12-2 as shown in FIG. 4.

Other aspects of the invention will be apparent to those of ordinary skill in the art.

What is claimed:

1. In combination:
   a stretchable and insulative cover formed by a blend of materials,
   means joined to said cover for promoting the retention of said stretchable and insulative cover on said seating surface and
   a continuous plastic seating surface under said cover;
   whereby said cover adapts said seating surface to a wide range of environmental conditions;
   further including a golf cart seat attached to said cover and means for attaching said cover to a non-seating portion associated with said surface.

2. A combination as defined in claim 1 herein said blend includes material which is absorptive of fluids.

3. A combination as defined in claim 1 wherein the insulative property of said cover is provided primarily by one constituent of said blend.

4. A combination as defined in claim 1 wherein said insulative cover is of a looped pile fabric of blended threads having at least two distinctively different physical characteristics.

5. Apparatus as defined in claims 4 wherein said looped pile fabric is a Terry cloth blend of textile filaments.

6. In combination:
   a stretchable and insulative cover formed by a blend of materials,
   means joined to said cover for promoting the retention of said stretchable and insulative cover on said seating surface and
   a continuous plastic seating surface under said cover;
   whereby said cover adapts said seating surface to a wide range of environmental conditions;
   wherein said means joined to said insulative cover comprises a plurality of side members which promote the retention of said stretchable cover panel on said seating surface.

7. A combination as defined in claim 6 further including a pouch of stretchable material for containing said cover.

8. A combination as defined in claim 6 wherein said means joined to said cover includes an elastomer in said blend to promote the retention of said stretchable cover panel on said seating surface.

9. A combination as defined in claim 6 further including a golf cart seat attached to said cover and means for attaching said cover to a non-seating portion associated with said surface.

10. A combination as defined in claim 6 wherein said blend is 25 percent polyester and 75 percent cotton.

11. The method of adapting a seating surface to a wide range of environmental conditions, which comprises the steps of:
   (A) removing a stretchable, retractable and insulative cover from a stretchable pouch;
   (B) placing said stretchable and insulative cover on said surface;
   promoting the retention of said stretchable and insulative cover on said seating surface; and
   (D) placing said cover on a cold surface to insulate said surface from contact with said cover;
   further including the step of increasing the retraction after stretching of said cover.

12. The method of adapting a seating surface to a wide range of environmental conditions, which comprises the steps of:
   (A) removing a stretchable, retractable and insulative cover from a stretchable pouch;
   (B) placing said stretchable and insulative cover on said surface;
   (C) promoting the retention of said stretchable and insulative cover on said seating surface; and
   (D) placing said cover on a cold surface to insulate said surface from contact with said cover;
   further including the step of placing said cover on a wet surface and absorbing fluid therefrom and increasing the retraction after stretching of said cover.

* * * * *